United States Patent Office 3,240,731
Patented Mar. 15, 1966

3,240,731
SILICONE ELASTOMER
Siegfried Nitzsche and Manfred Wick, Burghausen, Germany, assignors to Wacker-Chemie G.m.b.H., Munich, Germany
No Drawing. Filed Feb. 21, 1963, Ser. No. 260,293
Claims priority, application Germany, Mar. 26, 1962, W 31,920
11 Claims. (Cl. 260—18)

This invention relates to novel room temperature vulcanizing silicone rubber formulations and more particularly to the room temperature vulcanizing silicone rubber formulations based on acyloxy silane curing systems containing any of certain acid anhydrides.

The development of silicone rubber formulations capable of curing at ordinary temperatures (i.e. 10° to 100° C.) in a resonable length of time has been very rapid. Such rubber formulations have moved from the laboratory to gain wide acceptance in the market place within a remarkably short period of time.

The room temperature vulcanizing (RTV) silicone rubber formulations fall into two groups; namely, (1) the two component systems wherein the basic polymer, cross-linking agent and vulcanizing catalyst are mixed just prior to use and (2) the one component systems wherein the basic polymer and vulcanizing ssytem are mixed and stored and vulcanization occurs only upon exposure of the mixture to the air. This invention is primarily concerned with the one component systems.

One of the better known one component RTV silcone rubber systems is prepared by mixing a hydroxyl-containing essentially linear diorganosiloxane polymer with an acyloxy silane or an acyloxy siloxane in proportions such that the mixture contains at least one acyloxy group for each hydroxyl group present. This system must be mixed in the absence of moisture and must be stored under essentially moisture-free conditions to avoid premature vulcanization of the stock. Furthermore, the fillers and other additives employed in this system must be substantially free of water or the stock will not be stable during storage.

It is an object of this invention to introduce a novel room temperature vulcanizing silicone rubber stock of improved shelf life and storage stability. An RTV stock which vulcanizes to form elastomers of controlled hardness is also an object of this invention. Another object is an RTV silicone rubber stock which vulcanizes to form elastomers of controllable tear strength. Other objects and advantages of this invention are disclosed in or will be apparent from the specification and claims following.

This invention relates to the addition of from 0.1 to 5 percent by weight, based on the weight of base siloxane polymer present, of at least one anhydride of a saturated aliphatic carboxylic acid of 3 to 6 carbon atoms to an RTV silicone rubber stock consisting essentially of a hydroxyl-endblocked linear siloxane polymer, an acyloxy silane or an acyloxy siloxane polymer and, if desired, a filler and condensation catalyst.

The silicone rubber stocks of this invention are based on essentially linear siloxane polymers which can be represented by the general formula $HO(R_2SiO)_nH$ where $n$ is an integer having a value of at least 5 and each R is a monovalent radical selected from hydrocarbon radicals, halogenohydrocarbon radicals and cyanohydrocarbon radicals. The operative siloxane polymers can be essentially homopolymers wherein every R is the same such as a methylsiloxane or where every $R_2SiO$ unit is the same such as a phenylmethylsiloxane. Also operative are siloxane copolymers where the units in the polymer chain are different such as a copolymer of phenylmethylsiloxane units and dimethylsiloxane units and a copolymer of vinylmehtylsiloxane units and dimethylsiloxane units. Mixtures of homopolymers, copolymers or homopolymers and copolymers as well as block copolymers can be employed. The operative siloxane polymers are essentially diorganosiloxanes of unit formula $R_2SiO$ but minor proportions (i.e. below 5 mol percent) of $RSiO_{3/2}$ units, $R_3SiO_{1/2}$ units and/or $SiO_{4/2}$ units can be present. The average ratio of R/Si in the polymer can vary from 1.95/1 to 2.01/1 but the closer the ratio approaches 2.00/1 the better the resulting product. Although most of the silicon atoms in the polymer chains are bonded through Si—O—Si linkages, a minor proportion of silcarbane linkages such as $SiC_6H_4Si$ and $SiCH_2Si$ can be present.

The radicals represented by R are monovalent substituents bonded to silicon by C—Si linkage and can be hydrocarbon, halogenohydrocarbon or cyanohydrocarbon radicals. Illustrative of the radicals represented by R, but by no means an exhaustive listing, are the following: alkyl radicals such as methyl, ethyl, isopropyl, tert-butyl, dodecyl, octadecyl and myricyl radicals; alkenyl radicals such as vinyl, allyl and hexenyl radicals; cycloaliphatic hydrocarbon radicals such as cyclobutyl, cyclopentyl, cyclohexyl, cyclopentenyl, and cyclohexenyl radicals; aryl radicals such as phenyl, xenyl, naphthyl and phenanthryl radicals; aralkyl radicals such as benzyl and beta-phenylethyl radicals; alkaryl radicals such as tolyl and xylyl radicals; halogenohydrocarbon derivatives of the foregoing such as chloromethyl, pentafluorobutyl, trifluorovinyl, o, p, and m-chlorophenyl, 3,3,3-trifluoropropyl, bromophenyl, alpha,alpha,alpha - trifluorotolyl, bromoxenyl, chlorotrifluorocyclobutyl, chlorocyclohexyl and o, p, and m-iodophenyl; and cyanohydrocarbon radicals such as cyanoalkyl radicals, for example, beta-cyanoethyl, gamma-cyanopropyl, omega-cyanobutyl, beta-cyanopropyl, alpha-cyanobutyl and omega-cyanooctadecyl radicals. The preferred radicals are methyl, ethyl, phenyl, vinyl and 3,3,3-trifluoropropyl and it is preferred that at least 50 percent of the radicals represented by R be methyl radicals. When cyanohydrocarbon radicals are present, it is desirable to have them bonded to at least 1 percent of the silicon atoms present.

The operative siloxane polymers vary from low molecular weight fluids wherein $n$ has a value of 5–100 up to very high molecular weight, gum-like, solvent soluble polymers where $n$ may be 5,000 or more. The preferred polymers have viscosities in the range 5,000 to $5 \times 10^6$ cs. at 25° C., particularly polymers of viscosities in the range 20,000 to 100,000 cs. at 25° C.

The acyloxy silicon monomers and polymers employed herein include acyloxy silanes of the formula

$R_mSi(OOCR')_{4-m}$ and acyloxy siloxanes of the formula

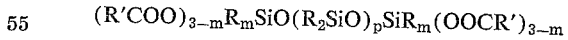
$(R'COO)_{3-m}R_mSiO(R_2SiO)_pSiR_m(OOCR')_{3-m}$ wherein R is as above defined, R' is a hydrogen atom or a monovalent hydrocarbon radical of 1 to 18 carbon atoms free of aliphatic unsaturation, $m$ is 0 or 1 and $p$ is 0–20,000. The acyl radicals represented by R'COO— or

$$R'\overset{O}{\underset{\|}{C}}O-$$

can be exemplified by formyl, acetyl, propionyl, butyryl, isovaleroyl, hexoyl, 2-ethylhexoyl, octanoyl, stearoyl, benzoyl, and p-toluylcarboxy radicals. An acetyl radical is preferred.

The acyloxy silanes can be tetraacyloxy silanes or organotriacyloxy silanes. The acyloxy groups on any one silicon atom in the silanes, and in the acyloxy siloxanes as well, can be the same or different. Thus, a methyldiacetoxybutyryloxysilane is as operable as a phenyltriacetoxysilane. In the acyloxy siloxanes the ($R_2SiO$)$_p$ portion of each molecule can be as varied as the ($R_2SiO$)$_n$ portion of the base siloxane polymers described above. Copolymers, homopolymers, mixtures of polymers, block copolymers, branched polymers having some $RSiO_{3/2}$ units and $R_3SiO_{1/2}$ units along the chain, and all the variations noted above for the base siloxane polymers can be employed as the acyloxy siloxanes.

The acyloxy silicon compound is employed in proportions such that at least one mol, preferably two mols of acyloxy substituent is present for each mol of silicon-bonded hydroxyl group. An excess of acyloxy substituent is not deleterious and 10 mols or more of acyloxy radical per mol of hydroxyl substituent is not deleterious but it does not offer any advantage.

The novel ingredient in the compositions of this invention is the anhydrides of saturated aliphatic carboxylic acids. The operative anhydrides contain 3 to 6 inclusive carbon atoms per molecule. Examples of operative anhydrides include formic acid-acetic acid anhydride, acetic acid anhydride, propionic acid anhydride, propionic acid-acetic acid anhydride as well as butyric acid-formic acid anhydride. Acetic acid anhydride is readily obtained and is preferred herein. The acid anhydride is employed in proportions ranging from 0.1 percent to 5 precent by weight based on the weight of the hydroxylated siloxane polymer and best results are achieved with 0.3 to 1.5 percent by weight of anhydride on the stated basis.

The acid anhydride can be mixed with the hydroxyl containing base siloxane polymer piror to, at the same time or subsequent to the addition of the acyloxy silane or siloxane. However, when the acid anhydride is added to the hydroxyl containing base siloxane polymer prior to addition of the acyloxy silicon ingredient, there appears to be a reaction between the hydroxyl groups bonded to silicon and the acid anhydride whereby a monofunctional acyloxy endblocked base polymer results and subsequent crosslinking to form an elastomer is not possible. The noted reaction occurs at a relatively slow rate such that an effectively poly-functional base polymer is obtained so long as the acyloxy silicon ingredient is added not later than 48 hours and preferably within 24 hours after the acid anhydride is admixed with the hydroxyl-endblocked siloxane polymers.

The addition of the acid anhydride ingredient to the organosiloxane polymer containing silicon-bonded hydroxyl groups prior to the addition of the acyloxy silicon ingredient improves the storage life of the mixture. This order of addition of ingredients also serves to increase the tear strength and elongation at break as well as decreasing the hardness, measured on the Shore scale, of the resulting elastomers. It may be necessary in each specific embodiment to take samples of the mixture of acid anhydride and hydroxyl-endblocked siloxane from time to time and determine whether the acyloxy silicon ingredient will effect the required crosslinking to achieve an elastomeric product. The effect of the acid anhydride on the hydroxyl-endblocked siloxane polymer is dependent upon time. The acyloxy silicon ingredient must be added before the acid anhydride has reacted with so many of the hydroxyl groups on the siloxane polymers that further reaction of the HOSi groups with acyloxy silicon compounds is not possible. Not all the Si bonded OH groups may be replaced by acyloxy groups from the acid anhydride before adding the acyloxy silicon compound. In general, the impact strength and Shore hardness of the ultimate rubber can be controlled by adding the acid anhydride to the hydroxyl-endblocked siloxane and permitting the mixture to stand at room temperature for a period ranging from 1 to 48 hours, preferably 4 to 24 hours, prior to adding the acyloxy silicon compound to the mass. The period of time noted in the preceding sentence can be shortened, if desired, by heating the mixture of acid anhydride and hydroxyl-containing siloxane polymer.

The acid anhydride can be added at the same time or subsequent to the addition acyloxy silicon ingredient in which case the effect of acid anhydride on hydroxyl groups present in the siloxane is controlled and a vulcanizable mixture with improved storage life is assured.

In addition to (1) the hydroxyl-endblocked siloxane polymer, (2) the acyloxy silicon compound and (3) the acid anhydride, the compositions of this invention can contain any of the additives commonly employed in silicone rubber stocks. Such additives include flame retardants, stabilizing agents, plasticizers, compression set additives, pigments, soluble dyes, perfumes, oxidation inhibitors, heat stabilizers, light protectants, anti-bacterial additives, disinfectants, medicinal materials as well as reinforcing and non-reinforcing fillers.

Fillers are commonly employed in silicone rubber stocks and can be present herein. Such fillers include fume silicas, silica hydrogels, silica aerogels and silica xerogels as well as other naturally occurring or manufactured silicas which can be pre-treated according to known methods whereby organosilyl surface groups are introduced on the silica surface. Other operative pulverulent fillers include calcium carbonate, diatomaceous earth, quartz flour, aluminum, nickel and other metallic powders, metal oxides such as titania, iron oxides, aluminum oxides and zinc oxides. Fibrous fillers are also operative and can be exemplified by glass fibers, asbestos fibers and cotton fibers. The fillers are usually employed in amounts ranging from 5 percent to 90 percent by weight based on the weight of the rubber stock. Mixtures of fillers are, of course, operable.

Another commonly employed ingredient in the compositions of this invention is a condensation catalyst. These catalysts aid in the vulcanization and curing of the rubber stock to form an elastomer. Operable condensation catalysts include oxalic acid, p-aminobenzoic acid, basic nitrogen compounds such as morpholine, alkanolamine such as triethanolamine, diethylaminoethanol and methyldiethanolamine, toluene sulfamide and urea derivatives. The preferred condensation catalysts are carboxylic acid salts of lead, tin, nickel, cobalt, iron, cadmium, chromium, zinc, manganese, zirconium, antimony, barium, calcium, titanium and bismuth such as lead naphthenate, cobalt naphthenate, zinc naphthenate, iron-2-ethylhexoate, lead-2-ethylhexoate, chromium octoate, lead sebacate, carbomethoxyphenyltin trisuberate, isobutyltin tricerolate, cyclohexenyl lead triacotinate, xenyl lead trisalicylate, dimethyltin dibutyrate, dibutyltin diacetate, divinyltin bis-cyclopentylacetate, dibutyltin dibenzoate, dibutyltin di-2-ethylhexoate, dibutyltin dilaurate, dibutyltin dimaleate, dibutyltin diadipate, diisoamyltin bis-trichlorobenzoate, dibutyltin diformate, dibutyltin dilactate, dicyclopentyl lead bis-monochloroacetate, dibenzyl lead di-2-pentenoate, diallyl lead di-2-hexenoate, tributyltin acetate, triphenyltin acetate, tricyclohexyltin acrylate, tritolyltin terephthalate, tri-n-propyl lead acetate, tristearyl lead succinate, trinaphthyl lead cyclohexenylacetate and triphenyl lead ethyl malonate. The condensation catalyst can be present over a broad range of weight proportions but best results are achieved with from 0.05 to 10 percent by weight of condensation catalyst based on the weight of hydroxyl-endblocked siloxane polymers present. Mixtures of condensation catalysts can be employed.

The compositions of this invention can be dispersed or dissolved in inert organic solvents if desired. The inert organic solvents are those which do not react with the Si bonded acyloxy groups and include hydrocarbon solvents such as benzene, xylene, toluene, and petroleum ethers, halogenated hydrocarbon solvents such as chlorobenzene and perchlorethylene, ethers such as diethyl ether and dibutyl ether, ketones such as methylisobutyl ketone, and fluid organosiloxane polymers free of Si bonded hydroxyl and acyloxyl groups.

The ingredients of the compositions of this invention are mixed at temperatures of 10° to 100° C. or higher, under any desired pressure without special drying of ingredients although excessive moisture in the filler, for example, may prove detrimental to storage stability. In general, commercial grades of the various ingredients are operable herein.

The compositions of this invention are stored in containers substantially excluding moisture. Commercial metallic and plastic tubes can be employed. Cans, tubs and other containers having closures capable of excluding moisture from the contents can be employed for storage. Generally, metallic containers should be lined with polyethylene or other organic polymer film.

The compositions of this invention can be vulcanized by exposure to atmospheric moisture at room temperature. Vulcanization rates can be controlled by controlling the amount of water or water vapor present in and around the silicone rubber stock to be vulcanized and by controlling the temperature at which the vulcanization occurs. In general, higher temperatures and more water increase the rate of vulcanization.

The compositions of this invention adhere firmly to other materials such as glass, porcelain, wood, metals and organic and silicon-organic synthetics. They are suitable for adhering silicone elastomers to steel and other metals and as aircraft, automotive and building sealants. They are also useful for all applications where RTV silicone rubber stocks are usually employed. They can be used as protective coatings, electrical and thermal insulation, impression materials, coating textiles, paper, leather and other fibrous substances, preparing foils, moulding materials and in laminates.

The following examples are include to aid those skilled in the art in understanding and practicing this invention. All parts and percentages are based on weight unless otherwise stated. All viscosities were measured at 25° C. unless otherwise stated.

*Example 1*

A mixture was prepared from 100 parts hydroxy endblocked dimethylsiloxane polymer of 23,000 cs. viscosity, 25 parts quartz flour, 25 parts diatomaceous earth and 4.5 parts methyltriacetoxysilane. Half of this material, designated as mixture A, was stored in sealed tubes without further additive. The other half of the material, designated mixture B, was further mixed with 0.25 part acetic acid anhydride (0.5 percent acetic anhydride based on weight of siloxane polymer), and was stored in sealed tubes. Before storage, a 1 mm. layer of each of the mixtures A and B vulcanized within 30 minutes at room temperature in air having 50 percent relative humidity to form an elastic film. After 14 days' storage, mixture A had hardened to an elastomer within the storage tubes and was therefore no longer useable. Mixture B retained its original consistency after 1.5 years of storage and remained active such that it vulcanized with undiminished rapidity at room temperature and 50 percent relative humidity.

*Example 2*

This example shows the effect of adding the acid anhydride to the hydroxyl-containing siloxane polymer prior to adding the acetoxy silicon compound. This effect is directly proportional to the time interval between adding the acid anhydride and adding the acetoxy silicon compound.

The ingredients employed in each mass consisted of 100 parts hydroxy-endblocked dimethylsiloxane of 23,000 cs. viscosity, 25 parts quartz fluor, 25 parts diatomaceous earth, 0.5 part acetic anhydride and 4.5 parts methyltriacetoxysilane. In a control sample, the ingredients were admixed all at one time. In other samples, the siloxane polymer, fillers, and acetic anhydride were mixed and mixtures were allowed to stand 2, 6, 24, 48 and 72 hours before the methyltriacetoxysilane was added and mixed therewith. The resulting stocks were vulcanized within 30 to 60 minutes at room temperature and 50 percent relative humidity to form identical test samples which were subjected to standard tests except for the sample wherein the acetic anhydride was added 72 hours prior to the methyltriacetoxysilane which sample would not vulcanize. The test results are set out below.

| Time Elapsed Between Adding Anhydride and Silane | Hardness-Shore Scale of Vulcanizate | Tear Strength of Vulcanizate,[1] kg./cm. |
| --- | --- | --- |
| Control—0 hours | 42 | 2 |
| 2 hours | 38 | 3 |
| 6 | 30 | 5 |
| 24 | 30 | 5 |
| 48 | 25 | 7 |
| 72 | 20 | 8 |
|  | ([2]) |  |

[1] Obtained in accordance with ASTM D624-54 using die B.
[2] No vulcanization.

*Example 3*

A mixture of 100 parts hydroxy-endblocked dimethylsiloxane of 23,000 cs. viscosity, 25 parts quartz flour, 25 parts diatomaceous earth, 2.25 parts methyltriacetoxysilane, 2.25 parts tetraacetoxysilane and 0.5 part acetic anhydride was prepared. The mixture (mixture C) is identical to mixture B in Example 1 but contains a more reactive acetoxy silane, namely tetraacetoxysilane as part of the cross-linking agent. The mixture C exhibited excellent shelf life. An 8 mm. layer of mixture C vulcanized within 24 hours at room temperature and 50 percent relative humidity whereas an 8 mm. layer of mixture B required 4 days to vulcanize.

*Example 4*

Mixtures D and E each contained 1,000 parts hydroxy-endblocked dimethylsiloxane polymer of 35,000 cs. viscosity, 1,000 parts quartz flour, 100 parts titanium dioxide and 28 parts phenyltriacetoxysilane. Mixture E also contained 6 parts propionic acid anhydride admixed at the same time as the phenyltriacetoxysilane. Both mixtures were stored in identical tubes under identical conditions. Mixture D vulcanized and hardened in the tubes after 1.5 days of storage and was then useless. Mixture E remained unchanged after more than a year of storage in tubes under identical conditions to those employed with mixture D.

*Example 5*

Mixtures G and H each contained 1,000 parts of a copolymeric hydroxy-endblocked siloxane containing 92.5 mol percent dimethylsiloxane units and 7.5 mol percent phenylmethylsiloxane units having a viscosity of 50,000 cs., 500 parts Neuburg siliceous chalk and 35 parts dimethyltetraacetoxydisiloxane. In addition, mixture H contained 4 parts acetic anhydride. Mixtures G and H were stored in identical tubes under identical conditions. Mixture G had vulcanized in the tubes after 3 days of storage whereas mixture H remained unchanged in viscosity or consistency after more than one year of storage.

*Example 6*

Mixtures J and K each contained 500 parts of hydroxy-endblocked dimethylsiloxane polymer of $1.2 \times 10^6$ cs. viscosity, 500 parts hydroxy-endblocked dimethylsiloxane polymer of 10,000 cs. viscosity, 150 parts fume silica, 350 parts diatomaceous earth, 0.5 part dibutyltin dilaurate, and 30 parts propyltriacetoxysilane. In addition, mixture K contained 8 parts acetic anhydride added at the same time as the acetoxysilane. The mixtures J and K were stored in identical sealed containers. Mixture J had vulcanized and become a useless gel after 14 days of storage. Mixture K remained unchanged and completely usable after more than one year of storage.

*Example 7*

When Example 2 was repeated employing 0.5 part of any of the following acid anhydrides in place of the acetic anhydride, similar results were obtained: formic acid-acetic acid anhydride; formic acid-propionic acid anhydride; acetic acid-propionic acid anhydride; and acetic acid-butyric acid anhydride.

Example 8

When Example 5 was repeated employing 775 parts of a diacetoxymethylsiloxy endblocked dimethylsiloxane having an average of 12 silicon atoms in the polymer chain or 7435 parts of a diacetoxymethylsiloxy endblocked dimethylsiloxane having an average of 102 silicon atoms in the polymer chain in place of the dimethyltetraacetoxydisiloxane, equivalent results were achieved.

Example 9

An excellent silicone rubber stock stable on storage resulted when 100 parts hydroxyl-endblocked dimethylsiloxane fluid, 4 parts 1,3,3,5-tetramethyl-1,5-diacetoxy-1,5-dipropionyloxytrisiloxane and 0.4 part acetic acid anhydride were mixed.

Example 10

Excellent, stable silicone rubber stocks capable of vulcanizing at room temperature and relative humidity of 50 percent were obtained when mixtures were prepared from (1) 100 parts hydroxyl-endblocked dimethylsiloxane polymer of 50,000 cs., (2) 2 parts tetraacetoxysilane or 3 parts methyltriacetoxysilane, and (3) .4 part acetic acid anhydride.

That which is claimed is:

1. A composition of matter stored substantially free of moisture consisting essentially of (1) at least one hydroxy-endblocked essentially linear diorganosiloxane polymer having an average of at least 5 silicon atoms per molecule and a viscosity not exceeding $5 \times 10^6$ cs. at 25° C., having an organic substituent/silicon ratio of from 1.95/1 to 2.00/1, and wherein the organic substituents bonded to silicon by C—Si bonding are monovalent hydrocarbon radicals, (2) at least one cross-linking agent selected from the group consisting of acyloxy silanes of the formula $R_mSi(OOCR')_{4-m}$ wherein each R is a monovalent organic substituent bonded to silicon by C—Si bonding and selected from the group consisting of hydrocarbon radicals, halogenohydrocarbon radicals and cyanoalkyl radicals, $m$ has a value from 0 to 1 inclusive, and each R' is a monovalent substituent selected from the group consisting of hydrogen atoms and hydrocarbon radicals free of aliphatic unsaturation containing from 1 to 18 carbon atoms and acyloxy siloxanes of the general formula $(R'COO)_{3-m}R_mSiO(R_2SiO)_pSiR_m(OOCR')_{3-m}$ where R, R' and $m$ are as above defined and $p$ has a value from 0 to 20,000 inclusive, and (3) 0.1 to 5.0 percent by weight based on the weight of siloxane polymer (1) of an anhydride of saturated aliphatic carboxylic acids containing from 3 to 6 inclusive carbon atoms per anhydride molecule.

2. The composition of claim 1 wherein the siloxane polymer (1) has the general formula $HO(R_2SiO)_nH$ where each R is a monovalent hydrocarbon radical and $n$ has a value of at least 5.

3. The composition of claim 1 further characterized in that it contains (4) a filler.

4. The composition of claim 2 further characterized in that it contains (4) a filler.

5. The composition of claim 1 further characterized in that it contains (5) a condensation catalyst.

6. The composition of claim 5 further characterized in that the condensation catalyst (5) is selected from the group consisting of carboxylic acid salts of lead, tin, nickel, cobalt, iron, cadmium, chromium, zinc, manganese, zirconium, antimony, barium, calcium, titanium and bismuth.

7. The composition of claim 2 further characterized in that it contains (4) a filler and (5) a condensation catalyst.

8. The method of preparing a room temperature vulcanizing silicone rubber stock consisting essentially of mixing (1) at least one hydroxy endblocked essentially linear diorganosiloxane polymer wherein the organic substituents bonded to silicon by C—Si bonding are monovalent radicals selected from the group consisting of hydrocarbon radicals, halogenohydrocarbon radicals and cyanoalkyl radicals, (2) at least one cross-linking agent selected from the group consisting of acyloxy silanes of the formula $R_mSi(OOCR')_{4-m}$ wherein each R is a monovalent organic substituent bonded to silicon by C—Si bonding and selected from the group consisting of hydrocarbon radicals, halogenohydrocarbon radicals and cyanoalkyl radicals, $m$ has a value from 0 to 1 inclusive, and each R' is a monovalent substituent selected from the group consisting of hydrogen atoms and hydrocarbon radicals free of aliphatic unsaturation containing from 1 to 18 carbon atoms and acyloxy siloxanes of the general formula $(R'COO)_{3-m}R_mSiO(R_2SiO)_pSiR_m(OOCR')_{3-m}$ where R, R' and $m$ are as above defined and $p$ has a value from 0 to 20,000 inclusive, and (3) 0.1 to 5.0 percent by weight based on the weight of siloxane polymer (1) of an anhydride of saturated aliphatic carboxylic acids containing from 3 to 6 inclusive carbon atoms per anhydride molecule, said anhydride of saturated aliphatic carboxylic acids (3) being added to the diorganosiloxane polymer (1) up to 48 hours prior to the addition of the cross-linking agent (2).

9. The method of claim 8 further characterized in that (4) a filler and (5) a condensation catalyst are admixed with the silicone rubber stock.

10. The method of claim 8 wherein the ingredients (1), (2) and (3) are admixed simultaneously.

11. The method of claim 8 wherein the ingredients (1) and (3) are admixed and allowed to stand for a period of from 4 to 24 hours and the ingredient (2) is then admixed with the mixture of (1) and (3).

References Cited by the Examiner

UNITED STATES PATENTS

| | | | |
|---|---|---|---|
| 2,843,555 | 7/1958 | Berridge | 260—46.5 |
| 2,858,241 | 10/1958 | Seidel et al. | 260—46.5 |
| 3,061,575 | 10/1962 | Russell | 260—37 |
| 3,065,194 | 11/1962 | Nitzsche et al. | 260—37 |
| 3,077,465 | 2/1963 | Bruner | 260—37 |
| 3,133,891 | 5/1964 | Ceyzeriat | 260—46.5 |

FOREIGN PATENTS 700,572  12/1964  Canada.

OTHER REFERENCES

Noller: Chemistry of Organic Compounds, W. B. Saunders Co., Philadelphia, 2nd ed. (1957), pp. 162–163. (Found in Scientific Library, QD 253 N65, and Group 140.)

LEON J. BERCOVITZ, *Primary Examiner.*

W. H. SHORT, *Examiner.*